United States Patent [19]

Mayer et al.

[11] 4,112,422

[45] Sep. 5, 1978

[54] METHOD AND APPARATUS FOR GENERATING MOVING OBJECTS ON A VIDEO DISPLAY SCREEN

[75] Inventors: Steven T. Mayer, Auburn; Ronald E. Milner, Grass Valley, both of Calif.

[73] Assignee: Atari, Inc., Sunnyvale, Calif.

[21] Appl. No.: 749,725

[22] Filed: Dec. 13, 1976

[51] Int. Cl.² ............................................. G06F 3/14
[52] U.S. Cl. .............................. 340/324 AD; 340/337; 358/93; 358/133; 273/85 G
[58] Field of Search .................. 273/102.2 R, 102.2 B, 273/DIG. 28, 85 R; 340/324 AD, 337; 358/93, 133, 138; 364/900 MS File, 200 MS File

[56] References Cited

U.S. PATENT DOCUMENTS

| | | | |
|---|---|---|---|
| 3,293,614 | 12/1966 | Fenimore et al. | 340/324 AD |
| 3,422,420 | 1/1969 | Clark | 340/324 AD |
| 3,713,135 | 1/1973 | Lazecki | 340/324 AD |
| 3,982,063 | 9/1976 | Brown et al. | 358/133 |
| 4,013,828 | 3/1977 | Judice | 358/133 |
| 4,026,555 | 5/1977 | Kirschner et al. | 340/337 |

*Primary Examiner*—Marshall M. Curtis
*Attorney, Agent, or Firm*—Flehr, Hohbach, Test, Albritton & Herbert

[57] ABSTRACT

A method and apparatus for generating moving objects for a video game display. Common apparatus including a microprocessor with RAM provides vertical motion for all objects and separate horizontal position counting hardware horizontal motion for each object. The microprocessor operating on a horizontal line pair basis drives a parallel to serial converter which stores one eight bit line portion of the object to be displayed which in turn is connected to a shift register. When the converted data is read out to the video display by action of the appropriate horizontal position hardware, it is recirculated to provide a repeat on the next horizontal line of the identical data. An effective one line moving resolution is obtained by utilizing another shift register for a one line delay by means of a switch which is set by a latch driven by the microprocessor.

9 Claims, 3 Drawing Figures

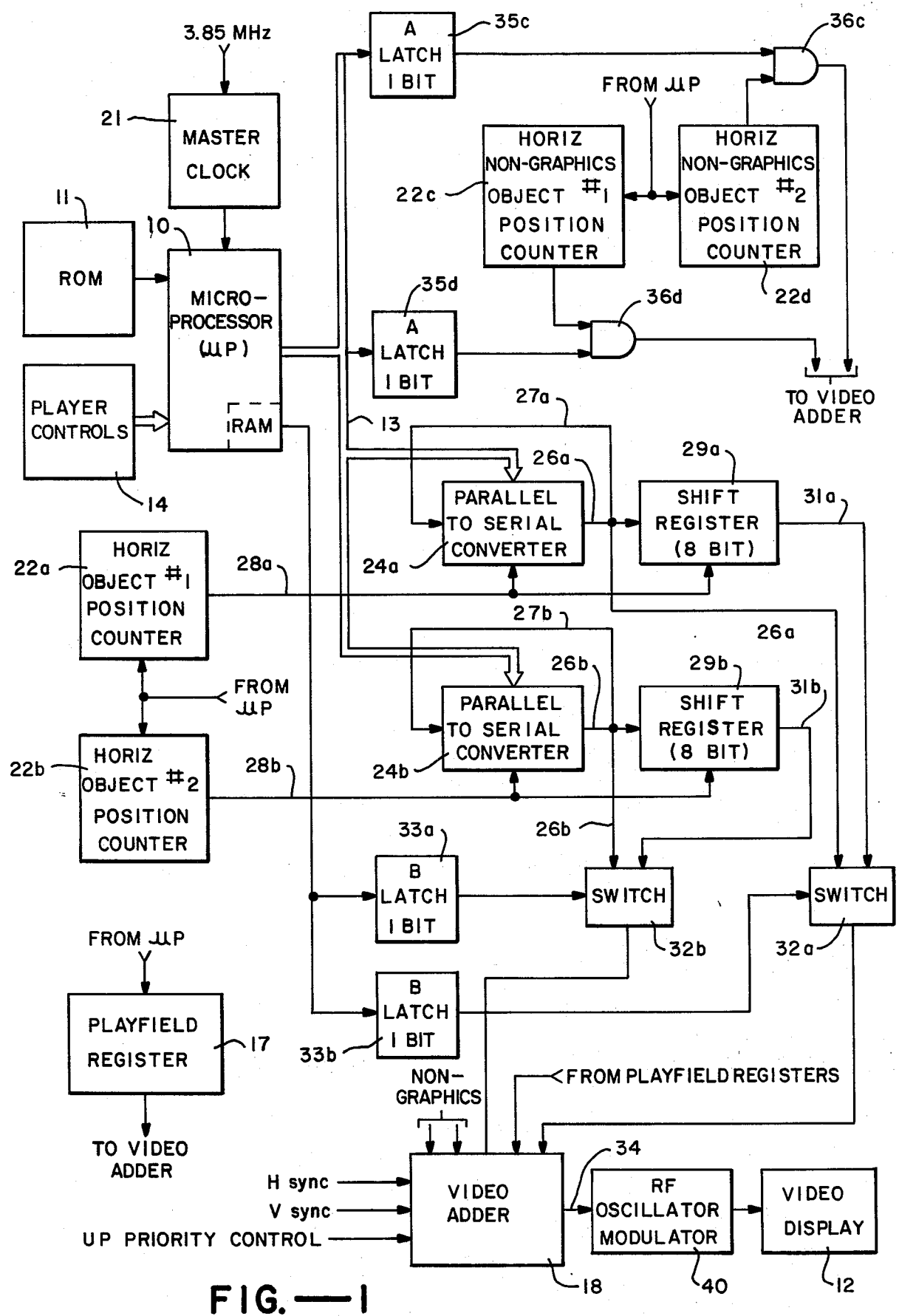
FIG.—1

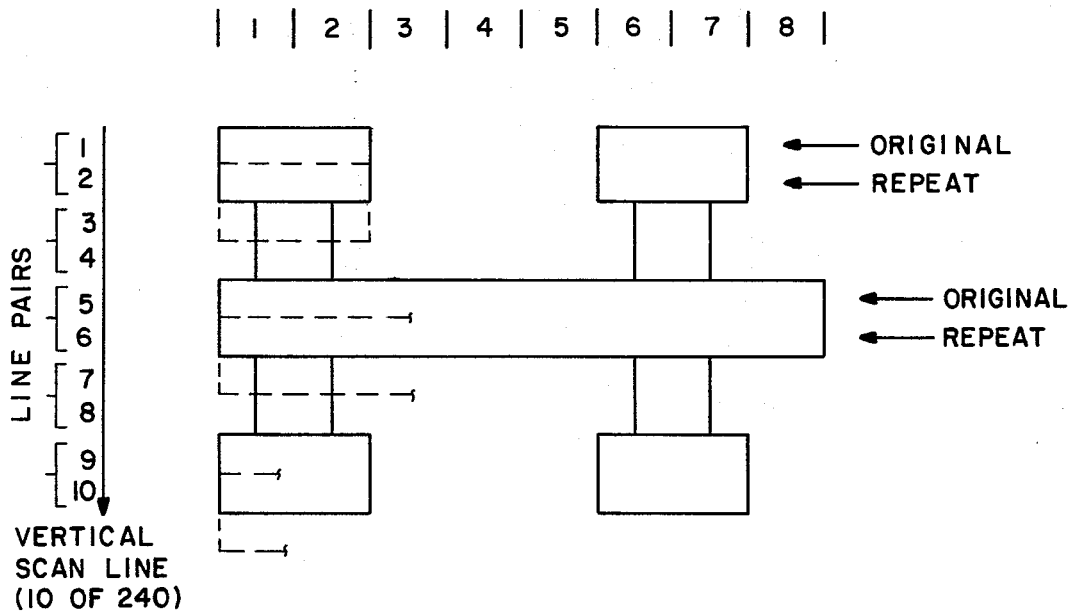
FIG.—2
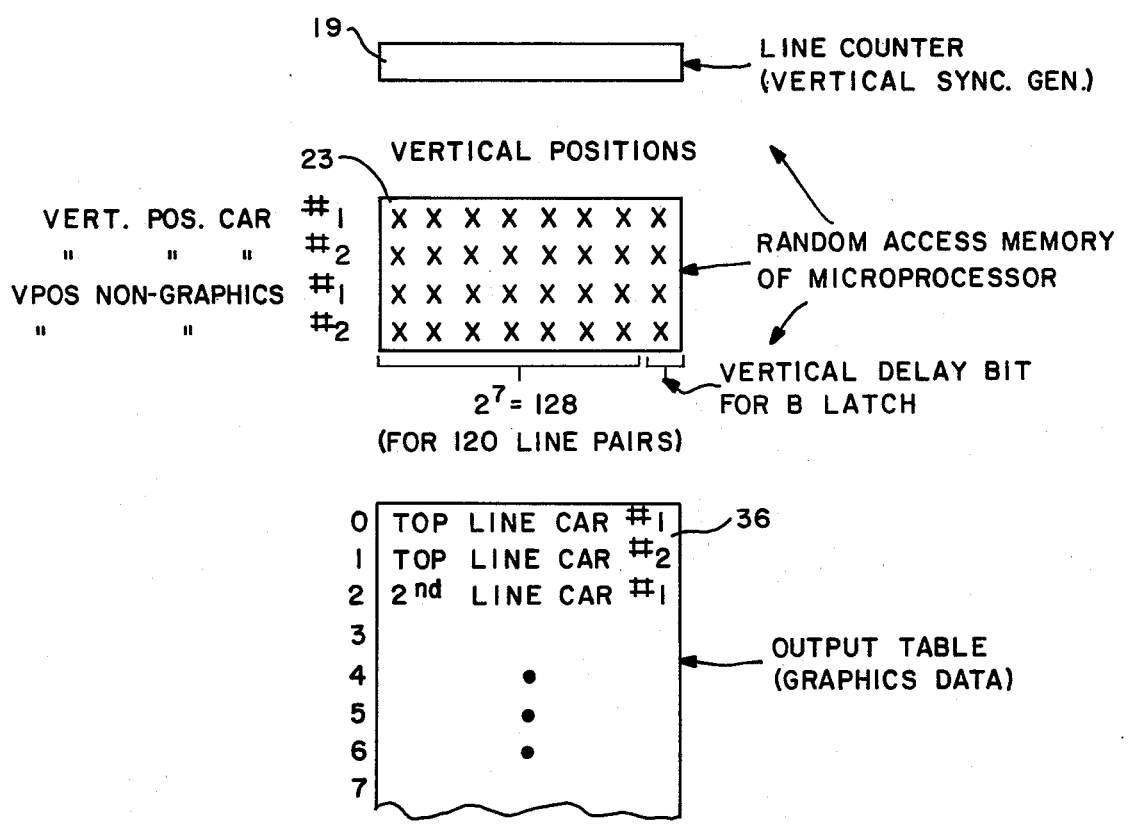
FIG.—3

METHOD AND APPARATUS FOR GENERATING MOVING OBJECTS ON A VIDEO DISPLAY SCREEN

BACKGROUND OF THE INVENTION

The present invention relates in general to a method and apparatus for generating moving objects on a video display screen and more particularly to the generation of moving objects in the context of a video amusement game.

With the increased use of video games in conjunction with home television receivers it is important to preserve flexibility and the ability to provide a full variety of games. In order to accomplish this, it is desirable that more of the games be set up in software (or firmware) as opposed to logic hardware which cannot easily be changed; i.e., the configuration of the game should be contained almost exclusively in a programmable read only memory (ROM) and the game can easily be changed by substitution of merely a new ROM.

A configuration as above, however, normally requires a relatively high speed and sophisticated computer or microprocessor with a large memory which conflicts with the necessity of a relatively low cost system for home use.

OBJECTS AND SUMMARY OF THE INVENTION

It is, therefore, a general object of the present invention to provide a method and apparatus for generating moving objects on a video display screen which is essentially under the control of system software but with a minimum processing hardware cost.

It is a more specific object of the present invention to provide a method and apparatus as above where the effective vertical resolution of the vertical position of the displayed object is increased while minimizing hardware cost.

It is another object of the invention to minimize memory requirements.

In accordance with the above objects there is provided apparatus for generating a plurality of moving objects on a video display screen scanned in successive frames by an image forming beam traversing the screen along a plurality of horizontal lines in response to horizontal and vertical synchronizing signals. Manual control inputs are provided for a plurality of game players with the control inputs determining the motion of the object. The apparatus comprises random access memory means for storing data indicative of the vertical positions at which the objects are to be displayed on a video display screen as determined by the control inputs. A plurality of horizontal position means each correspond to one of the plurality of objects for storing data indicative of the horizontal position of the corresponding object and are responsive to the control inputs for changing the position. A plurality of horizontal storage register means connected to video adder means each correspond to one of the plurality of objects for storing graphics data in response to the actual vertical position of the beam coming within range of the stored vertical position. They are also responsive to an output signal from a horizontal position means corresponding to such object for transferring the graphics data to the video adder means.

From a method standpoint there is provided a method of generating an object on a video display screen which is scanned in successive frames by an image forming beam traversing the screen along a plurality of horizontal lines in response to horizontal and vertical synchronizing signals. A microprocessor has graphics data stored in its associated memory. The current vertical position of the scan is sensed and a plurality of data bits, representing such graphics data, is stored in a first memory under control of the microprocessor if an object is to be displayed. One horizontal line later the data is shifted to a second memory while recirculating the data back into the first memory. The horizontal window of the horizontal line is sensed where the data is to be displayed. The data from one of the first and second memories is displayed on the screen in response to the vertical object position starting on the first or second line of a horizontal line pair. Then in response to the next horizontal line the display of the data in a previous line is repeated.

BRIEF DESCRIPTION OF THE DRAWINGS

FIG. 1 is a block diagram illustrating the circuit of the present invention;

FIG. 2 is a typical video display of an object constructed in accordance with the method of the present invention; and FIG. 3 is a block diagram of a portion of a random access memory which is also shown in FIG. 1.

DETAILED DESCRIPTION OF THE PREFERRED EMBODIMENT

Referring to FIG. 1, the video game of the present invention is controlled by a microprocessor 10 which has an internal random access (RAM) or scratchpad memory and an associated read only memory (ROM) 11 which contains the configuration or architecture of one or more video games which are to be played on the video display unit 12 which is typically a home television receiver. The video games may include a race course with two cars, two tanks firing missiles at each other, ping pong type games and unlimited variations of all of the foregoing. The logic and circuits illustrated in FIG. 1 are normally contained in a single unit which is attached to the antenna terminals of the television receiver 12. The player controls may be included in the unit or in separate units.

Microprocessor 10 controls the playfield graphics, such as a race course for cars or a battlefield for tanks, and at the same time continuously scans the player controls 14 which determine the motion of the objects. More specifically, a playfield table in ROM 11 is under the control of microprocessor 10 and outputs playfield graphic data to playfield registers 17 which in turn are connected to a video adder 18. To conserve memory area the playfield table stores only the top left quadrant of the picture to be displayed the remainder of the picture being mirror images of this quadrant. This is accomplished by proper readout of playfield registers 17. Many variations of the foregoing are possible in that the playfield may be reflected vertically, horizontally or in any combination selectively.

A playfield graphics display technique is also disclosed and claimed in a copending application Ser. No. 706,121, filed July 16, 1976, in the names of Mayer et al entitled "Method For Generating A Plurality of Moving Objects on a Video Display Screen" and assigned to the present assignee.

In order to accomplish all of its control functions microprocessor 10 requires a time greater than more than one horizontal line scan but less than two horizontal scan lines of processing time. To accommodate this cycle time the video frame of 240 effective horizontal scan lines is divided into 120 line pairs. Object information stored in ROM 11 is related to line pairs. Microprocessor 10 has an internal line counter 19 (FIG. 3), a portion of the internal RAM, which counts every other horizontal sync pulse to provide line pair timing. Other master timing including generation of horizontal sync pulses is provided by a master clock 21. This clock is driven by a 3.58 MHz oscillator. Microprocessor 10 waits at the end of a line pair for such a horizontal pulse to resume operation. This ensures the computer is in time coincidence even though it has completed processing at an earlier line.

In the embodiment illustrated in FIG. 1 four horizontal object position counters 22a-d are controlled by microprocessor 10 with counters 22a,b corresponding to graphics objects #1 and #2 such as cars, tanks, or airplanes and counters 22c,d corresponding to non-graphics objects #1 and #2 such as missiles (i.e., a non-graphics object can be represented by one or more electron beam spots in a single line). Counters 22a-b store data indicative of the horizontal position of its associated object and is responsive to player controls via microprocessor 10 for changing that position. They are similar to those shown in U.S. Pat. No. 3,793,483 in the name of Nolan K. Bushnell and assigned to the present assignee and in a copending application Ser. No. 613,050, filed Sept. 15, 1975, in the name of Allan E. Alcorn entitled "Video Image Positioning Control System". Although only four counters have been shown some video games might require five. For example, a ping-pong game with four paddles and a ball.

No separate vertical counter is necessary as vertical position control is handled by the microprocessor 10 which maintains vertical position information in its RAM based indirectly on inputs from player controls 14. Ths allows great flexibility in the video game architecture. Such vertical positions for the four objects are stored in portion 23 (FIG. 3) of the RAM in an 8 bit format. Seven bits provide for 120 line pairs of data ($2^7 = 128$) and the eighth bit is used to provide an effective single line resolution to be discussed below.

Data output bus 13 of microprocessor 10 is connected to 8 bit parallel to serial converter and storage units 24a,b. Data is read out of converters 24a,b on their output lines 26a,b and recirculated via lines 27a,b under respective control of horizontal counters 22a,b on lines 28a,b. Outputs 26a,b also serve as the inputs to 8 bit shift registers 29a,b which have outputs 31a,b. As will be discussed below shift registers 29a,b serve as one line delays to effectively increase the moving vertical resolution to one line of the objects which are displayed. Output lines 26a,31a and 36b,31b are respectively connected to switches 32a,b which are controlled by one bit B latches 33a,b. The latches are controlled by the eighth bit of RAM portion 23 (FIG. 3) of microprocessor 10.

The outputs of switches 32a,b are the graphics to be displayed of a particular horizontal 8 bit line portion the line being divided into 255 effective bits. The switch outputs are connected to video adder 18 where appropriate horizontal and vertical sync signals are added to form on line 34 a composite video signal which is finally connected to the antenna terminals of a receiver 12, through an RF oscillator modulator 40. Such modulator is normally tunable to either channel 3 or 4 of the VHF band.

Non-graphics data (e.g., missiles) on bus 13 drives A latches 35c,d which in cooperation with counters 22c,d and gates 36c,d inputs data to video adder 18.

A typical object to be displayed, as shown in FIG. 2, is a race car. It is 8 bits long horizontally and is 10 vertical scan lines or five line pairs in vertical width. Every other horizontal scan line is a repeat of the previous. This allows the microprocessor 10 two horizontal lines for processing time. This is especially important where microprocessor 10 is controlling more than one object (as would be the typical case) since it must time share its capacity between the several moving objects being displayed.

The operation of the method of the present invention is as follows. If an object has rotated, once a frame during vertical blanking a picture of each graphics object is built in an output table 36 (FIG. 3) which is a part of the RAM. Since program ROM 11 determines the configuration of the game such data is transferred from ROM 11.

Next the internal line pair timing (counter 19, FIG. 3) is compared with the actual vertical position of each object as determined by player controls 14. If it is within range (see the Mayer copending application), the object is to be displayed. If the object is of the non-graphics type, e.g., a missile or paddle, the A latch is set. If graphics data, 8 bits of graphics information is transferred to converter 24a or 24b over bus 13. Moreover in addition to comparing a vertical object position with the actual counter position, microprocessor 10 determines whether this position is the first or second line of a line pair and if the second, sets the B latch by means of the eighth data bit of RAM portion 23. If a B latch is set, all data will be delayed one line and thus come from shift registers 29a or 29b and the dashed outline of FIG. 2 will be displayed. Otherwise the solid line object of FIG. 2 will be displayed with the B latch not being enabled and thus all graphics data comes directly from the parallel to serial converter and memory units 24a or 24b.

Assuming the latter is the case the eight bit horizontal memory indicated in FIG. 2 would be converters 24a or 24b and would contain data bits in the first and second memory positions and in the sixth and seventh on the first line pair. One of the horizontal object position counters 22a,b will cause the data to be read out of converters 24a,b through switches 32a,b and thus displayed. At the same time data is again recirculated into converter 24a or 24b and thus saved. It is also concurrently shifted into register 29a or 29b. On the next horizontal line the window output of the horizontal object position counter 22a or 22b will again cause the data to be read out and displayed. Data will also be read out of shift register 29a or 29b but, of course, it will be ignored since switch 32a or 32b has left the output line 31a or 31b unconnected.

Two horizontal lines later during the horizontal blanking interval after the first line pair new graphics data which would be line 3 is stored in converter 24a or 24b for reading out during the actual horizontal line scan.

If nongraphics are to be on, an A latch is set to provide an output to video adder 18. If no objects are to be displayed, both latches A and converters 24a,b are cleared by a clear output from microprocessor 10.

In the case where the object is to be shifted one horizontal line as shown by the partial dashed outline of FIG. 2, microprocessor 10 which keeps track of the vertical time by means of its internal counter compares the actual vertical time with the desired vertical object position. If the second line of a pair is to be used, the appropriate B latch is set as discussed above. However, other than setting the B latch the second line display is transparent to the microprocessor and the 8 bit line portion of graphics data is read out to the converter 24a or 24b in the horizontal blanking interval before the first line of the line pair. And on yet the next line the same data is repeated since the recirculated data in converter 24a or 24b will have been shifted into register 29a or 29b during the first readout of its data. However, it will not be displayed on the next horizontal line since switch 32a or 32b is now in its other condition and line 26a or 26b from the converter is unconnected. On the next horizontal line scan or one line delayed, shift register 29a or 29b will have been loaded because of the attempted readout on line 26a or 26b and it will display the object as shown in dashed outline in FIG. 2. The above sequence will occur until the full object is displayed.

The registers 24a,b and 29a,b are enabled only during the 8 bit horizontal length of the object by the horizontal object position counters 22a,b. By reactivating such registers, under the control of microprocessor 10, more than once during a horizontal line scan multiple horizontal windows are produced. Thus a row of planes, ducks, etc. can easily be produced. Furthermore, by control of the read out rate from such registers horizontal size is also easily controlled.

By the use of separate horizontal motion hardware for each object in combination with a microprocessor controlled or common vertical motion system several other advantages accrue. For example, objects may overlap. A priority control input to adder 18 from microprocessor 10 determines for example whether or not a plane is hidden by a playfield cloud. Another advantage is that multiple circuits of the type shown in FIG. 1 can be easily interfaced with one another for more players.

Thus, an improved method and apparatus for generating moving objects on a video display screen has been provided.

What is claimed is:

1. A method of generating an object on a video display screen scanned in successive frames by an image forming beam traversing the screen along a plurality of horizontal lines in response to horizontal and vertical synchronizing signals and where a microprocessor has stored in its associated memory graphics data said method comprising the following steps: sensing the current vertical position of said scan and the desired vertical object position and storing a plurality of data bits, representing said graphics data, in a first memory under control of said microprocessor if an object is to be displayed; one horizontal line later shifting said data to a second memory while recirculating such data back into said first memory; sensing the horizontal window of said horizontal line where said data is to be displayed and causing said data from one of said first and second memories to be displayed on said screen in response to the vertical object position starting on the first or second line of a horizontal line pair; and in response to the next horizontal line repeating the display of the data in the previous line.

2. A method as in claim 1 including the step of timing the processing of said microprocessor in response to a horizontal sync signal.

3. A method as in claim 1 where said first memory also converts parallel data bits from said microprocessor into a serial format.

4. A method as in claim 1 where said plurality of stored data bits is equivalent to the horizontal length of an object displayed.

5. A method as in claim 1 where the processing time required by said microprocessor is always more than one horizontal line time but less than two.

6. A method as in claim 1 where in the horizontal blanking interval after the end of a line pair new data is stored in said first memory.

7. A method of generating an object on a video display screen scanned in successive frames by an image forming beam trasversing the screen along a plurality of horizontal lines in response to horizontal and vertical synchronizing signals and where a microprocessor has stored in its associated memory graphics data for said plurality of horizontal lines, said method comprising the following steps: sensing the current vertical position of a line pair and the desired vertical object position and storing a plurality of data bits, representing said graphics data, in a memory under control of said microprocessor if an object is to be displayed at such position; sensing whether said object is to be displayed in the first or second line of said pair; and sensing the horizontal window of said horizontal line pair where said data is to be displayed and causing said data from said memory to be immediately displayed on said screen in response to the vertical object position starting on the first line of a horizontal line pair or delaying such display one line if the display position starts on the second line; and repeating the display of the data in the previous line.

8. Apparatus for generating a plurality of moving objects on a video display screen scanned in successive frames by an image forming beam traversing the screen along a plurality of horizontal lines in response to horizontal and vertical synchronizing signals and where manual control inputs are provided for a plurality of game players said control inputs determining the motion of said objects said apparatus comprising: random access memory means for storing data indicative of the vertical positions at which the objects are to be displayed on said screen as determined by said control inputs; a plurality of horizontal position means each corresponding to one of said plurality of objects for storing data indicative of the horizontal position of the corresponding object and responsive to said control inputs for changing said position; video adder means; a plurality of horizontal storage register means connected to said video adder means each corresponding to one of said plurality of objects for storing graphics data in response to the actual vertical position of said beam coming within range of said stored vertical position and responsive to an output signal from a horizontal position means corresponding to such objects for transferring said graphics data to said video adder means.

9. Apparatus as in claim 8 together with a microprocessor where said horizontal position means is connected to and controlled by said microprocessor.

* * * * *